April 15, 1924.

C. C. SPREEN

VALVE STRUCTURE

Filed June 25, 1923

Charles C. Spreen
Inventor
By Smith and Freeman
Attorneys

April 15, 1924.

C. C. SPREEN 1,490,884

VALVE STRUCTURE

Filed June 25 1923

Charles C. Spreen
Inventor
By Smith and Freeman
Attorneys.

Patented Apr. 15, 1924.

1,490,884

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF DELAWARE.

VALVE STRUCTURE.

Application filed June 25, 1923. Serial No. 647,500.

*To all whom it may concern:*

Be it known that I, CHARLES C. SPREEN, a citizen of the United States, residing at Detroit, in the county of Wayne and State of Michigan, have invented a certain new and useful Improvement in Valve Structures, of which the following is a full, clear, and exact description, reference being had to the accompanying drawings.

There are in use at the present time one-way valves arranged to control the communication between what may be called an inlet duct and what may be called an outlet duct and two-way valves arranged to control the communication between one inlet duct and two separate outlet ducts or reversely between two separate inlet ducts and one outlet duct. Valves of each of these species are of course suitably formed to afford the apertures necessary to receive the desired communicating ducts and in particular where the valve body is made relatively thin suitable bosses are provided to strengthen the body adjacent the duct-receiving apertures. So far as I am aware, however, the two species have always been considered separate and distinct and there has been produced no single structure adapted to be used for both purposes. In many cases, however, valves of the two species otherwise substantially identical are employed in connection with the same apparatus. In such cases, for both initial construction and subsequent repair, it is manifestly of considerable advantage to employ a single composite structure from which either species of valve may be formed. My invention provides such a composite structure. In the drawings accompanying this specification and forming a part thereof I have shown, for purposes of illustration, one physical embodiment which my invention may assume. In these drawings:

Figure 3:
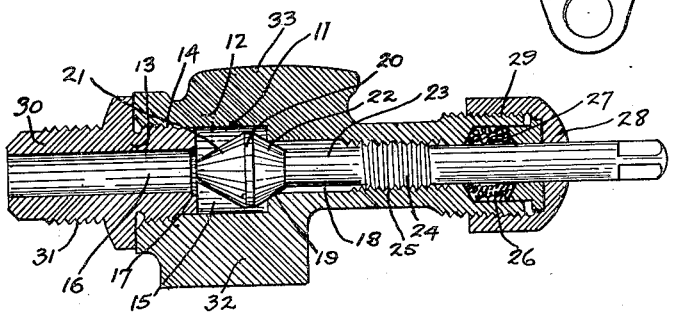
Figure 3 is a section on the line 3—3 of Figure 2.
Figure 4:
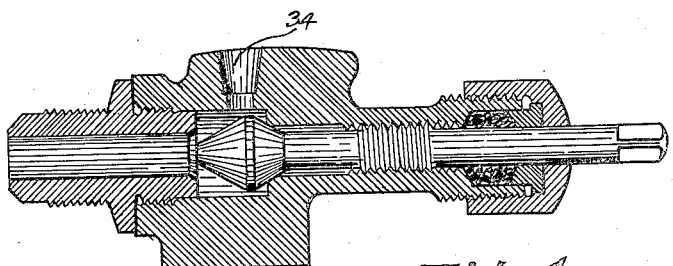
Figure 4 is a section similar to Figure 3 showing the structure completed to form a one-way valve.
Figure 5:
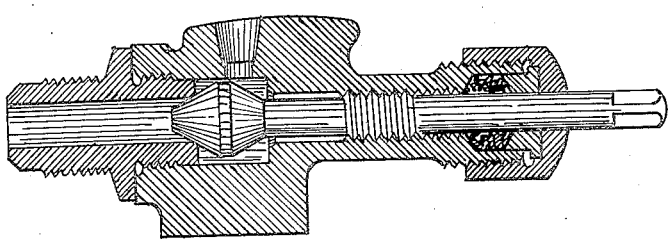
Figure 5 is a view similar to Figure 4 showing the valve of Figure 4 in closed position.
Figure 6:
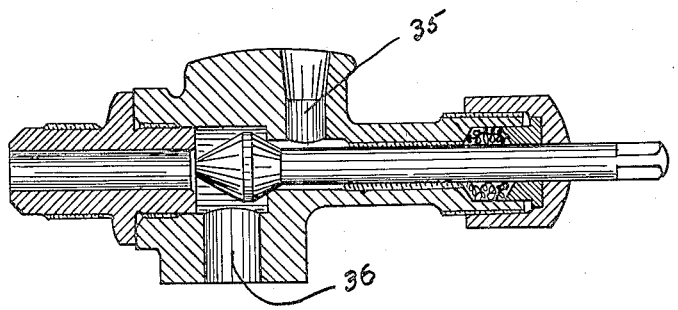
Figure 7:
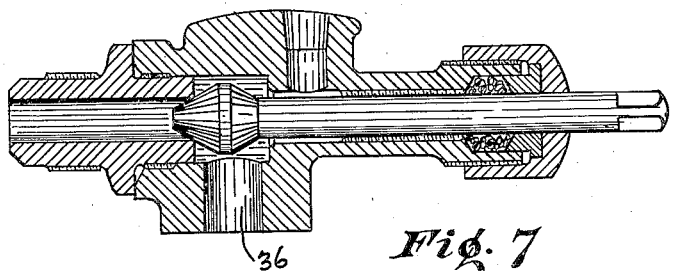
Figure 8:
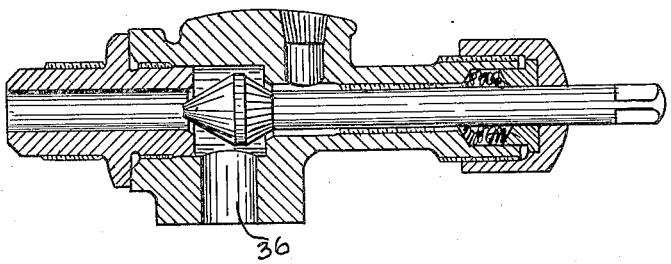
Figure 9:
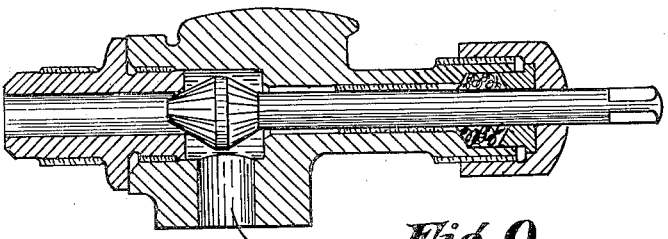
Figure 10:
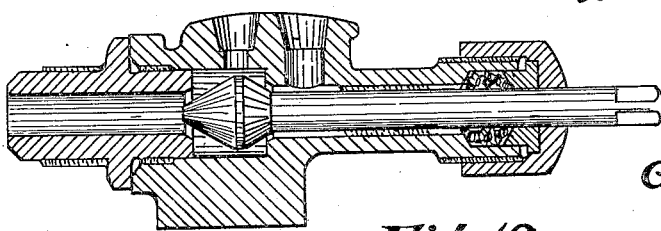

Figures 6, 7, and 8 are views similar to Figure 3 showing the structure completed as a two-way valve and respectively in first extreme position, second extreme position, and mid-way position, Figure 9 is a section similar to Figure 4 showing the composite valve completed as a one-way valve but in a manner alternative to that illustrated in Figures 4 and 5, while Figure 10 is a section similar to Figure 6 showing the composite structure completed as a two-way valve but in a manner alternative to that disclosed in Figures 6, 7, and 8.

Figure 1:
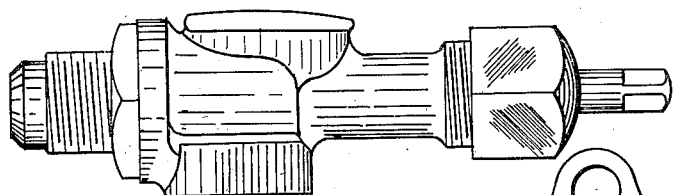
Figure 1 is a side elevation of this illustrative structure.
Figure 2:
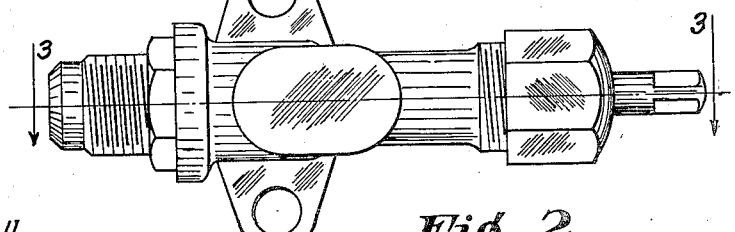
Figure 2 is a plan view of the device shown in Figure 1.

The composite structure shown in Figures 1, 2, and 3 comprises a valve housing 11 formed for convenience from two separate portions 12 and 13 screw-threadedly connected at 14. The housing 11 is provided within itself with a central chamber 15, a first end chamber 16 separated from the central chamber 15 by a valve seat 17, and a second end chamber 18 separated from the central chamber 15 by a second valve seat 19. Positioned within the central chamber 15 is a two-way valve head 20 provided with a surface 21 adapted to engage the valve seat 17 and a surface 22 adapted to engage the valve seat 19. This valve head 20 is shown as carried by the end of a valve stem 23 which is provided with screw threads 24 arranged to engage cooperating screw threads 25 carried by the housing 11 whereby rotation of the valve stem 23 will reciprocate the valve head 20 between one extreme position where the face 22 of the valve head 20 engages the valve seat 19 and another extreme position where the face 21 of the valve head 20 engages the valve seat 17 through an intermediate position wherein neither face 22 or 21 is in engagement with its valve seat 19 or 17.

The structure herein described is preferably provided with means to prevent leakage at the valve stem 23 and this means is herein shown as comprising a recess 26 in the housing 11 adapted to be filled with suitable packing 27 which may be secured in position by means of a valve cap 28 screw threaded to the casing 11 at 29.

In the construction herein disclosed the first end chamber 16 is shown as an aperture leading to the exterior of the housing through a boss 30 screw threaded at 31 to receive a suitable connecting duct while the housing 11 is shown as generally of insufficient thickness to permit the formation therein of additional duct-receiving apertures but as provided upon its lower portion with a boss 32 adapted to permit the formation therethrough of a duct-receiving aperture leading to the central chamber 15 and on its upper surface with a boss 33 adapted to permit the formation therethrough of a duct receiving aperture leading into the chamber 15 or a duct-receiving aperture leading into the chamber 18 or of both such apertures. Accordingly the structure illustrated in Figures 1 through 3 is especially and peculiarly formed to permit its completion into a valve of the one-way species or a valve of the two-way species and in addition is formed to permit its completion into any one of various types of each species.

In Figures 4 and 5 I have illustrated the formation from the structure of Figures 1 through 3 of one type of valve of the one-way species which is shown as formed by the formation in the generic structure of a single aperture 34 through the boss 33 into the chamber 15; in Figures 6, 7, and 8 I have illustrated the formation from the generic structure of one type of valve of the two-way species which is shown as formed from the generic structure by the provision of an aperture 35 through the boss 33 into the end chamber 18 and the provision of an aperture 36 through the boss 32 into the central chamber 15; in Figure 9 I have illustrated the formation from the generic structure of an alternative form of one-way valve formed by the provision in the generic structure of merely the aperture 36 leading through the boss 32 into the central chamber 15; and in Figure 10 I have illustrated the formation from the generic structure of an alternative type of two-way valve formed by the provision in the generic structure of the aperture 34 leading into the central chamber 15 and the aperture 35 leading into the end chamber 18.

It will be obvious from the above description that I have provided herein a generic structure capable of being formed into a valve of either species and in addition capable of being formed into any one of several types of valve of each species. It will also be obvious that this generic structure may be formed into types of each species other than those herein illustrated and in addition may perhaps be formed into additional species. It will therefore be obvious that my invention is not limited strictly to the types and species herein disclosed but that on the contrary the embodiment disclosed herein, the utility of which is so readily apparent, is illustrative only.

I claim:

1. A partially formed valve comprising: a housing having a central chamber, a first end chamber provided with an opening adapted to receive a duct, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; a boss on said housing reinforcing said housing to permit the formation of an aperture adapted to receive a duct and extend through said housing into said central chamber; and a second boss on said housing reinforcing said housing to permit the formation of an aperture adapted to receive a duct and extend through said housing into said central chamber and the formation of a separate aperture also adapted to receive a duct and extend through said housing into said second end chamber.

2. A valve partially formed comprising: a housing having a central chamber, a first end chamber provided with an opening adapted to receive a duct, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; and bosses on said housing reinforcing said housing to permit the formation of two apertures each adapted to receive a duct and extend through said housing into said central chamber and one aperture adapted to receive a duct and extend through said housing into said second end chamber.

3. A partially formed valve comprising: a housing having a central chamber, a first end chamber, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; a boss on said housing reinforcing said housing to permit the formation of an aperture adapted to receive a duct and extend through said housing into said central chamber; and a second boss on said housing reinforcing said housing to permit the formation of an aperture adapted to receive a duct and extend through said housing into said central chamber and a separate aperture adapted to receive a duct and extend through said housing into one of said end chambers.

4. A partially formed valve comprising: a housing having a central chamber, a first end chamber, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; and a single boss on said housing reinforcing said housing to permit the formation of an aperture adapted to receive a duct and extend through said housing into said central chamber and a separate aperture adapted to receive a duct and extend through said housing into one of said end chambers.

5. A partially formed valve comprising: a housing having a central chamber, a first end chamber, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; a boss on said housing reinforcing said housing to permit the formation of an aperture adapted to receive a duct and extend through said housing into one of said chambers; and a second boss on said housing reinforcing said housing to permit the formation of an aperture adapted to receive a duct and extend through said housing into the same chamber and a separate aperture adapted to receive a duct and extend through said housing into another of said chambers.

6. A partially formed valve comprising: a housing having a central chamber, a first end chamber, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; and bosses on said housing reinforcing said housing to permit the formation of two apertures each adapted to receive a duct and extend through said housing into one of said chambers and one aperture adapted to receive a duct and extend through said housing into another of said chambers.

7. A partially formed valve comprising: a housing having a central chamber, a first end chamber, a second end chamber, a passage connecting said central chamber to said first end chamber and provided with a valve seat, and a passage connecting said central chamber to said second end chamber and also provided with a valve seat; a valve head adapted to operatively engage either of said seats; means arranged to move said valve head between a position in which said head engages one of said valve seats and a position in which said head engages the other of said valve seats through an intermediate position in which said head engages neither of said valve seats; and a single boss on said housing reinforcing said housing to permit the formation of an aperture adapted to receive a duct and extend through said housing into one of said chambers and a separate aperture adapted to receive a duct and extend through said housing into another of said chambers.

8. A partially formed valve comprising: a housing having a first chamber and a second chamber and a passage connecting said first chamber to said second chamber and provided with a valve seat; a boss on said housing reinforcing said housing to permit the formation of an aperture adapted to receive a duct and extend through said housing into one of said chambers; and a second boss on said housing reinforcing said housing to permit the formation of an aperture adapted to receive a duct and extend through said housing into the same chamber and a separate aperture adapted to receive a duct and extend through said housing into the other of said chambers.

9. A partially formed valve comprising: a housing having a first end chamber and a second chamber and a passage connecting said first chamber to said second chamber and provided with a valve seat; and bosses on said housing reinforcing said housing to permit the formation of two apertures each adapted to receive a duct and extend through said housing into one of said chambers and one aperture adapted to receive a duct and extend through said housing into the other of said chambers.

10. A partially formed valve comprising: a housing having a first chamber and a second chamber and a passage connecting said first chamber to said second chamber and provided with a valve seat; and a single boss on said housing reinforcing said housing to permit the formation of an aperture adapted to receive a duct and extend through said housing into one of said chambers and a separate aperture adapted to receive a duct and extend through said housing into the other of said chambers.

In testimony whereof, I hereunto affix my signature.

CHARLES C. SPREEN.